United States Patent Office 2,913,179
Patented Nov. 17, 1959

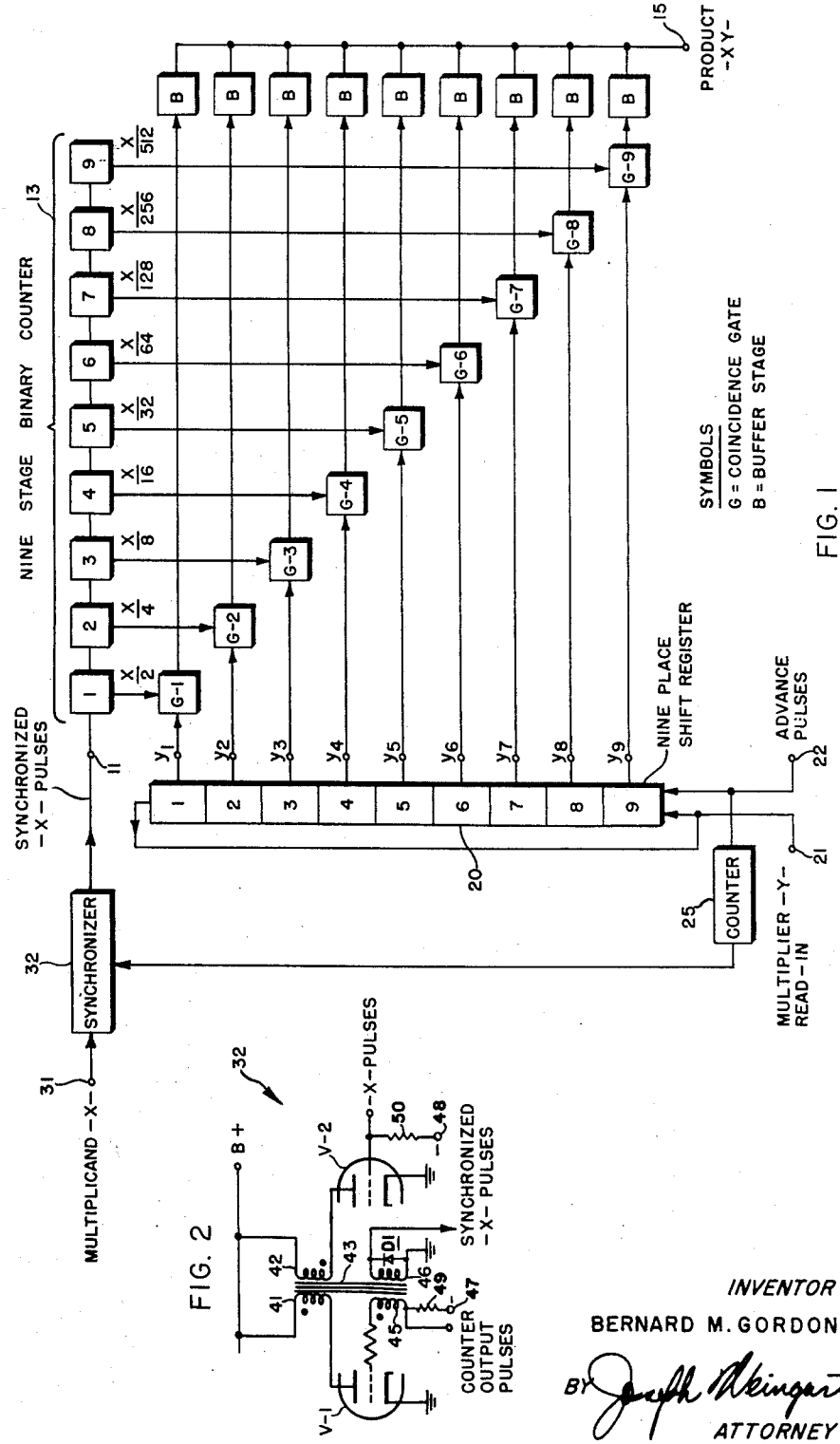

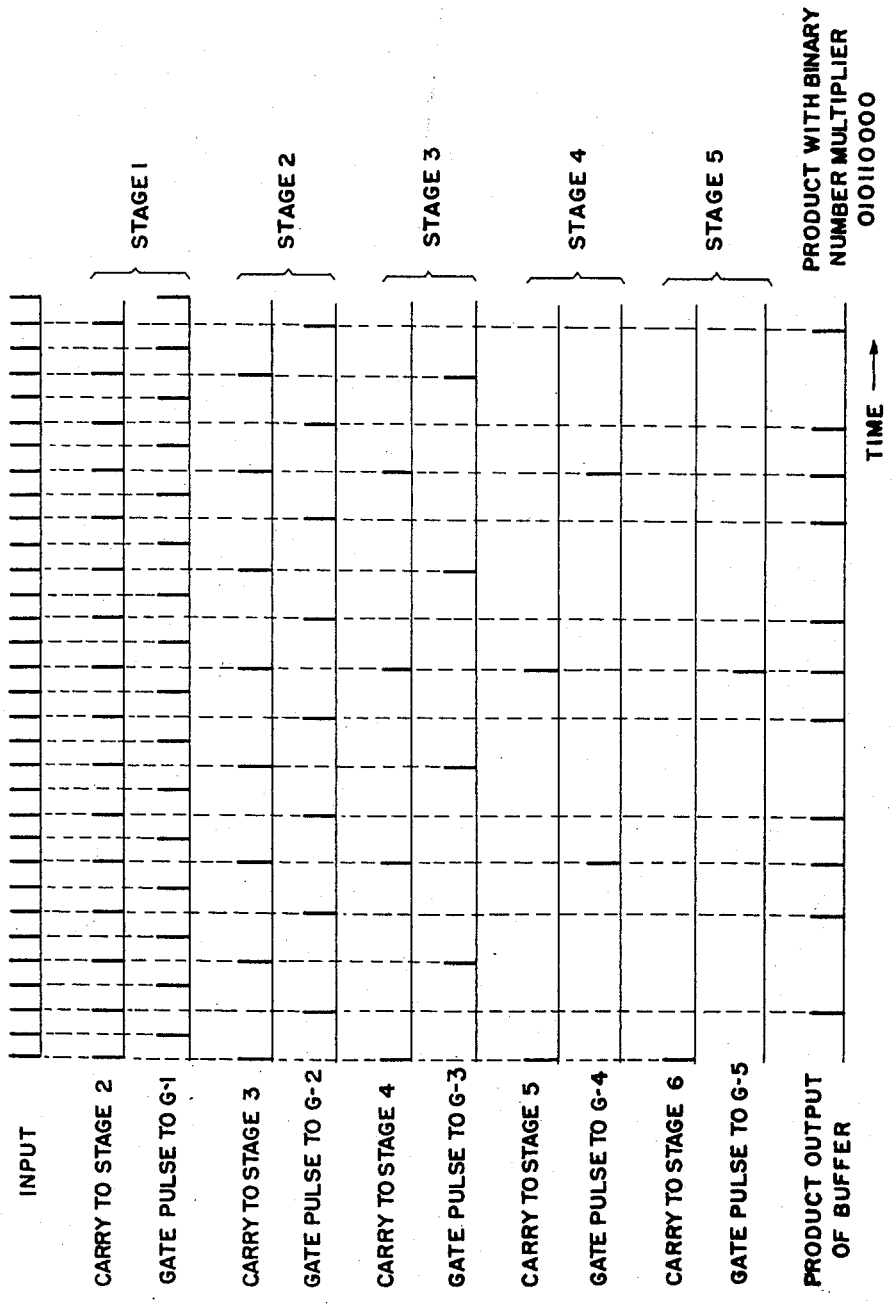

2,913,179

SYNCHRONIZED RATE MULTIPLIER APPARATUS

Bernard M. Gordon, Concord, Mass., assignor to Laboratory for Electronics, Inc., Boston, Mass., a corporation of Delaware Application May 15, 1953, Serial No. 355,325

7 Claims. (Cl. 235—164)

The present invention relates in general to electrical computation systems and more specifically concerns a novel digital multiplier circuit capable of continuously and reliably forming products of predetermined signals at exceptionally high speed, if required, with a minimum of conventional, dependable electronic components.

This application represents a novel extension of the principles set forth in the copending application of Maurice A. Meyer and Bernard M. Gordon, Serial No. 324,312, filed December 5, 1952 and entitled Computation Circuit. To furnish background information, certain portions of the copending application have been reproduced below.

Within the broad subject classification of digital computers, there have been described numerous forms of electronic multiplying circuits for yielding a digital output representing the product of two or more digitally expressed input numbers. The manner in which the input signals are represented often governs the ultimate choice of a multiplier. In the serial type, the multiplier receives simultaneously only a single digit from each of the multiplier and multiplicand, while in the so-called parallel systems, all digits of both multiplier and multiplicand are introduced to the multiplier simultaneously. In some digital computing machines, both serial and parallel number representations are employed, and multipliers are available for operation under the control of such mixed signals. It is, however, characteristic of substantially all available digital multiplying systems, irrespective of whether serial or parallel notation is used, that both multiplier and multiplicand are necessarily expressed as a definite number of digits, and that the product is correspondingly a number of a fixed quantity of digits, each represented electrically.

The problems involved in electrical computation are somewhat different if one of the input signals, although digital in form, is not a number in the customary sense, but rather a pulse train where the absolute value of the quantity represented is some established function of the pulse rate at any given time; while the other input signal is presented in digital notation bearing a definite number of terms. To illustrate the need for computation under these circumstances, consider a continuous wave Doppler radar system where the frequency deviation of the signal return continuously indicates the relative radial velocity between the radar installation and the reflecting target, and where it is necessary to multiply this velocity by a fixed or variable quantity available in digital form within the radar system. A pulse train representing frequency deviation may be generated by a suitable discriminator or similar circuit, and in the aforementioned copending application, a digital multiplier was presented capable of furnishing a continuous digital response representing the product of this pulse train and a number available in parallel line digital notation. In that application, a continuous, self-coding process was disclosed whereby proportional information in the pulse train appeared for use in binary notation within the multiplier; but upon multiplication, the product emerged at the output once again as a proportional pulse train.

Generally speaking, the continuous coding or conversion disclosed in the prior application was achieved by energizing a series of cascaded binary counter stages from the input pulse train signal, and applying the output of each stage to a corresponding number of gate circuits which were either open or closed in accordance with the polarities of the potentials of the parallel line binary multiplier signal. The desired product, or rate multiplication, was derived as the electrical combination of all gate output circuits and means were disclosed to preclude ambiguities which would result were two gate circuits permitted to pass outputs simultaneously.

The scope of application of the prior invention was inherently confined to situations where steady potentials were available on the parallel lines representing the binary multiplied. Where the source of the binary multiplier is a device such as an electromechanical analog-to-digital converter, this requirement may be met without great difficulty. However, in a large number of digital computer and other mathematical systems, such static potentials are ordinarily unavailable and may be obtained only through the addition of considerable costly and space consuming equipment.

Representative of the particular problem here posed is a computer system wherein the desired multiplier signal exists only in the form of a continuously circulating code in an acoustic, electrostatic or magnetic memory or storage unit. With reference back to the Doppler radar system, assume that the pulse rate representing velocity was to be multiplied by an angle function to be selected from a dynamic memory unit. Except for a brief interval during each circulating period, the stored signal is inaccessible so that it is not possible to provide continuous parallel line binary potentials to serve as a multiplier for a variable rate input. With specific reference to the prior application, the inaccessibility of a binary number while wholly within the storage system precludes excitation of the gate circuits as required to form the rate product.

The present invention contemplates and has as a primary object the provision of a novel computation circuit in which a pulse train whose rate of recurrence is proportional to a desired parameter, may be continuously acted upon by a binary multiplier, even though this multiplier is available only intermittently, without the requirement of complex conversion circuits.

In one aspect of the present invention, advantage is taken of the phenomenon that in a rate multiplier of the type disclosed in the above-noted copending application, potentials are required on the binary parallel multiplier lines solely during the intervals that pulses of the input pulse train are applied to the system. For example, if the input pulse train should comprise 1000 uniformly spaced pulses per second, and the binary multiplier is one-half, then 500 pulses per second will appear at the output, and each of these pulses will coincide precisely in time with the appearance of alternate input pulses. It is immaterial then, that the binary multiplier signal appear or does not appear on the binary input lines during the period between input pulses.

Therefore, an object of the present invention is to provide a rate multiplier wherein operational synchronism is achieved between a circulating binary multiplier and the appearance of input data pulses. By thus synchronizing two otherwise unrelated phenomena, the need to provide special equipment for converting circulating binary signals to static signals on parallel binary lines is avoided. It will become evident that not only does this minimize the need for special equipment, but also substantially reduces system power demand.

Still further objects and advantages of the present invention will now become apparent upon consideration of the following detailed specification when taken in connection with the accompanying drawing in which:

Fig. 1 is a block diagram showing the logical arrangement and interconnection of elements, functionally identified, capable of forming the required product;

Fig. 2 is a schematic diagram typically representative of a circuit associated with the system illustrated in Fig. 1; and Fig. 3 is a graphical representation of the pulse timing sequence of the rate multiplier illustrated in Fig. 1.

With reference now to the drawing, and more particularly to Fig. 1 thereof, there is illustrated a combination of circuit elements incorporating the principles of this invention and include, to a certain extent, sub-combinations already fully disclosed in the above-noted copending application. More particularly, the apparatus to the right of terminals 11 and $Y_1$, $Y_2$, $Y_3$ . . . $Y_9$ functions in subtantially the manner indicated in the prior application. For completeness and clarity, however, the operation of this portion of the invention will be reviewed here.

To obtain a product, a multiplicand, herein designated as synchronized X pulses, is applied at terminal 11 as a pulse train whose repetition rate instantaneously is related to the absolute value of a quantity. The significance of the term "synchronized" will appear later. The multiplier signal, bearing the notation Y, is applied in binary form to a parallel array of nine terminals $Y_1$, $Y_2$, $Y_3$ . . . $Y_9$. Each of these terminals is either energized at a preselected potential or is grounded, depending upon whether the particular binary multiplier represented by that terminal is to be used. In Fig. 1, the uppermost of the multiplier terminals is when activated, the binary multiplier Y/2, the next terminal is the binary component Y/4, and so on, whereby the ninth and last terminal shown represents the binary multiplier Y/512.

Returning now to a consideration of the application of the synchronized multiplicand X, it is seen that this signal is used to energize the input of a cascaded binary counter 13, having a number of individual stages to correspond with the number of binary multiplier terminals, which in this instance is nine. Two distinct signals are derived from each counter stage; one of which is used as a carry to trigger the stage immediately following, while the other represents the binary count of that stage. These weighted counts, it will be observed, are marked appropriately as X/2, X/4 . . . X/512. No carry is required from the output of the final stage.

The weighted output of each counter stage is directly applied to a corresponding one of nine coincidence type gate circuits identified on the drawing as G-1, G-2 . . . G-9, which gates are either open or closed, as determined by whether the correspondingly numbered binary multiplier terminal coupled to that gate is activated or not.

Each gate circuit output is coupled through an individual buffer circuit B, the function of which is to preclude interaction of gate circuit outputs, and the outputs of all buffer stages are then combined in parallel at output terminal 15, which furnishes in digital form the product of X and Y.

Consider the synchronized multiplicand X as a frequency of occurrences, and assume that the number of occurrences is to be multiplied by another number Y, where Y is less than unity. By applying the multiplicand to the nine cascaded binary counter stages, weighted outputs of X/2, X/4 . . . X/512 are continuously obtained and applied to the corresponding gates. The multiplier Y is also applied to these gates in binary form and where a gate is simultaneously actuated by multiplier and multiplicand signals, it will pass through the buffers and to the output terminal 15, the corresponding weighted counter output. The combination of all gate outputs will furnish the product of multiplicand and multiplier at terminal 15, provided that no two signals occur at the same time on the lines coupling the individual counter stages to the correspondingly numbered gates.

Consider the multiplicand X as a number of occurrences, and assume that the number of occurrences is to be multiplied by another number Y, where Y is less than unity and expressed in binary notation. By applying the multiplicand to the nine cascaded binary counter stages, weighted outputs of X/2, X/4 . . . X/512 subevents per unit time are obtained and applied to the corresponding gate. The multiplier Y is intermittently applied to these gates in binary form and where a gate is simultaneously actuated by multiplier and subevent signals, it will pass an output pulse through the buffers to the output terminal 15. The combination of all gate outputs will furnish an output signal having a number of impulses per unit time equal to the product of the multiplicand occurrences per unit time with the number represented by the binary multiplier, provided that no two gated output pulses coupled to terminal 15 occur at the same time.

Analytically, the sub-product $P_n$, equal to the number of output pulses per unit time delivered by the $n$th gate may be expressed as:

$$P = (X/2^n)Y_n$$

where $Y_n$ represents the digit of $n$th significance in the binary number representative of the quantity Y and determines the effect of the $n$th multiplier terminal. $Y_n$ is either 1 or 0 and determines respectively whether the corresponding line is activated or not. The final product P is simply the summation of all sub-products:

$$P = \sum_0^n P_n = \sum_0^n \frac{X}{2^n} Y_n = X \sum_1^n \frac{Y_n}{2^n}$$

Since the number of input events X corresponds to a first quantity independent of $n$, it may be moved outside the summation sign as indicated. Then, by recognizing that the desired product is XY, and matching coefficients in the equations $$P = XY = X \sum_0^n \frac{Y_n}{2^n}$$

the following relation is obtained:

$$Y = \sum_0^n \frac{Y_n}{2^n}$$

Thus, each term, $$\frac{Y_n}{2^n}$$

represents the contribution of each digit in the binary representation of the number Y, characteristic of a second quantity.

As an example of such multiplication, if the input X were to be multiplied by 0.653, the nearest binary multiplier would be 101001110 and only terminals $Y_1$, $Y_3$, $Y_6$, $Y_7$ and $Y_8$ are activated while the remaining terminals are grounded. The activated lines would represent decimal contributions of 0.5, +0.125, +0.016, +0.008, +0.004, respectively. Therefore, the number of output events at terminal 15 will be equal to 0.653X. As X represents a number of input events, the number of output subevents at terminal 15 during the same time interval represents the desired product XY.

In the copending application, circuit embodiments of the binary counter stages, gates and buffers were illustrated and described and it was there shown that by suitable selection of the carry signal and the gate signal, a wholly interlaced time pattern of output pulses could be obtained. No two input pulses to the gates could occur simultaneously and this effect was made independent of the frequency of input multiplicand pulses. This is explained in detail below in connection with the discussion of Fig. 3.

In Fig. 1, the inputs to the parallel line binary input on terminals $Y_1 \ldots Y_9$ are derived from nine-place shift register 20 arranged for re-circulating storage. Shift register circuits are well-known and comprise fundamentally means in which information may be stored and propagated linearly under the control of a signal known as an advance pulse. Shift registers have been constructed utilizing electron tube flip-flop circuits, acoustical and electrical delay networks, and of magnetic cores having substantially rectangular hysteresis loops.

Shift register 20 illustrated in Fig. 1 has input terminals 21 and 22 which are used respectively for the application of signals to read-in a particular binary number to be stored and to advance, at some predetermined frequency, all digits from stage to stage. The information instantaneously stored in stage 9 of shift register 20 represents the least significant digit of the binary number while information stored in register stage 1 represents the most significant digit. In operation, each binary digit to be stored in the shift register is read-in as a pulse or no pulse at terminal 21 in synchronism with advance pulses applied to terminal 22. For the register shown, where the output of stage 1 is coupled back to the read-in terminal of stage 9, the first nine advance pulses will result in the storage in proper sequence of a predetermined nine-place binary number under the control of the signal applied to the read-in terminal 21. If no further signals are then applied to terminal 21 while advance pulses of constant frequency are applied to terminal 22, the information contained in the register will propagate at the advance pulse frequency and will appear in proper sequence in the nine stages once for every nine applied advance pulses. In this manner, then, a circulating shift register may be utilized to store information for any desired period. New information may be read-in in accord with the dictates of the system in synchronism with the advance pulses to alter the value of the number in the register. For reference purposes, a magnetic shift register fitted for application in the computation circuit herein disclosed is described in a paper entitled Static Magnetic Storage and Delay Line, Journal of Applied Physics, vol. 21, January 1950.

Treating shift register 20 as a magnetic unit of the type disclosed in the cited publication, pulses representing the multiplier binary code appear at terminals $Y_1 \ldots Y_9$ only when an advance pulse is applied to terminal 22. Reiterating, however, these pulses have true significance once during a period measured by nine advance pulses. At this critical time, the Y terminals will be energized by potentials in an order truly representative of the multiplier and then only for the brief period measured by the pulse duration.

Many computational systems are in operation utilizing shift registers, and there are numerous known approaches to the problem of indicating the instant when the shift register carries the binary information in the proper sequence. In Fig. 1, there is shown a counter 25 operative from the input advance pulses appearing at terminal 22. Counter 25 may readily be adapted to provide a single output pulse for each nine advance pulses and further may be readily adjusted so that this output pulse occurs precisely when the binary multiplier appears in proper sequence in the shift register. A suitable circuit for providing such an output pulse is a blocking oscillator triggered by a counter circuit in response to nine advance pulses of a type well known in the art. For example, a representative circuit is shown in Fig. 257 on page 234 of the text Radar Electronic Fundamentals, Navships 900,016, published by the Navy Department Bureau of Ships in June 1944. As indicated in the accompanying text therein, the number of pulses required to trigger the blocking oscillator may be selected over a wide range merely by adjusting the bias of the blocking oscillator tube.

The output of counter 25 together with the input multiplicand X pulses appearing at terminal 31 are applied to synchronizer 32 to provide the above-discussed synchronized X pulses to the input at terminal 11 of the binary counter 13.

Functionally, synchronizer 32 is a device which, upon the receipt of a multiplicand X pulse at input terminal 31, at a random time, produces a pulse at some later time, under the control of counter 25. Effectively then, the synchronizer briefly stores a multiplicand X pulse until released by a counter output pulse.

One manner in which pulse synchronization may be accomplished is illustrated in the circuit of Fig. 2. Here, the synchronizer comprises a pair of triode electron tubes V1 and V2 energized from a positive power source B+ through the oppositely oriented coils 41 and 42 of a magnetic unit 43. Both tubes are normally cut-off by bias sources providing negative potentials on terminals 47 and 48 coupled to the grids of tubes V1 and V2 through resistors 49 and 50, respectively. The grid of tube V1 is energized by the periodic pulses from the output of counter 25 (Fig. 1) through coil 45, the grid of tube V2 is energized by multiplicand X pulses, and the synchronized X pulse output is taken from coil 46. Magnetic unit 43 is preferably a single toroidal core having a substantially rectangular hysteresis characteristic for storage of information in the form of a bistable residual flux of a first or opposite polarity. All four coils are wound on this toroidal form.

When in operation, multiplicand X pulses are applied positively to the grid of tube V2 thus pulsing and setting core 43 into one stable flux state through coil 42. The counter output pulse immediately following applied positively to the control grid of tube V1 will pulse core 43 through coil 41 in the opposite direction, reverse the polarity of the residual flux, and in so doing, will generate a synchronized X pulse in output winding 46 for application to terminal 11 in Fig. 1. Additional counter pulses prior to the receipt of an X pulse will be without effect due to core saturation. A subsequent X pulse will reset the core and also produce an output pulse in coil 46, but note that this output will be of opposite polarity to the synchronized X pulse generated as above. This unwanted pulse may be short-circuited by a suitably poled crystal diode D1. Once reset by an X pulse, the next succeeding counter pulse will release a synchronized X pulse.

Coil 45 is so oriented that in the period between counter pulses, the receipt of an X pulse generates a negative pulse which is applied to the grid of tube V1. Coil 45 functions primarily under circumstances where an X pulse and counter pulse are received simultaneously. The turns ratio of coils 42 and 45 is such that in the event that pulses are simultaneously applied, the negative potential induced in coil 45 precludes conduction in tube V1, so that the X pulse controls the core state. Therefore, each X pulse input will be accompanied by an output pulse in coil 46 of desired polarity and at a time spacing determined by counter pulses applied to tube V1.

The frequency relationship of multiplicand X pulses and counter output pulses is critical to the extent that the first may not occur at a rate greater than the last. In other words, the minimum period between multiplicand X pulses at terminal 31 must be less than the repetition rate of pulses at the output of counter 25, or less than the repetition rate of nine advance pulses appearing at terminal 22.

With this basic frequency relationship in view, it is at once evident that an output pulse from counter 25 will always set the magnetic core in synchronizer 32 prior to the occurrence of the next succeeding multiplicand X pulse. In other words, the pulses passed through the synchronizer to terminal 11 must always occur in time coincidence with an output pulse from counter 25. It is emphasized that this does not mean that the multiplicand pulses must be equal in frequency to the output pulses of counter 25. More than one counter output pulse may occur before the occurrence of the next multiplicand pulse at termnial 31, but when a random data pulse does appear at terminal 31, it will be passed through to terminal 11 only when the next succeeding counter output pulse is generated.

With reference to Fig. 3, there is illustrated a graphical representation of the pulse timing sequence of the binary rate multiplier comprising the nine stage binary counter, the gates and the buffers to show an example of how an output pulse train is provided on terminal 15 having a number of impulses per unit time related to the product of the synchronized X pulses applied on terminal 11 with the number represented by the binary signal applied on lines $Y_1$–$Y_9$. Thus, on the first line in Fig. 3, there are shown thirty-two consecutive multiplicand input pulse representations corresponding to an X of thirty-two input events. Assuming now that these are applied to input terminal 11 of Fig. 1, and based upon the previous discussion of Fig. 2, stage 1 of counter 13 will yield as one output, a sequence of 16 carries, and as a second output, a sequence of 16 alternately spaced signals for application to gate G–1. Thus there are 16 carry and 16 output pulses for gate operation which occur in mutually exclusive time intervals.

Counter stage 2 responds only to each pair of carry pulses from stage 1 to yield in turn one carry to counter stage 3 and one significant pulse to gate G–2. In a similar manner stages 3, 4, 5 . . . $n$, each respond to two pulses from the next preceding stage to furnish one pulse to the respective gate and one carry pulse to the next stage. In Fig. 3, the effect of this arrangement is shown for the first five stages, the carry outputs and the outputs to the gates being shown on the same time scale. It may now be observed that no output pulse shown falls in time coincidence with any other counter stage output pulse. On the other hand carry outputs are quite frequently coincident in time, but the carry pulses do not pass through the gates and buffers to contribute to the final system output. Although the principle that no two outputs may occur simultaneously has been demonstrated for five stages only, it is effective for any number of counter stages used in the multiplier.

To illustrate system operation by reference to a specific example, assume that the binary number representing Y is 010110000. Then, only terminals $Y_2$, $Y_4$ and $Y_5$ will be energized to open the associated gates G–2, G–4 and G–5, to couple output pulses to terminal 15. Utilizing the equation $$Y = \sum_{1}^{n} \frac{Y_n}{2^n}$$

Y in this example is $$0 + \frac{1}{2^2} + 0 + \frac{1}{2^4} + \frac{1}{2^5} + 0 + 0 + 0 + 0$$

or $11/32$, expressed as a fraction.

Since only the second, fourth, and fifth digits of the binary number are one, only output pulses from counter stages 2, 4 and 5 in Fig. 1 will be coupled to output terminal 15. With reference to Fig. 3, if the output pulses shown for stages 2, 4 and 5 are selected for the interval fixed by the thirty-two input pulses on the first line, eleven output pulses, as shown in the lowermost line will be provided on terminal 15 in the sequence indicated. Note then that the input was the quantity thirty-two, represented by the thirty-two input pulses for a given time, the multiplier was $11/32$ set up in binary form on the Y terminals, and the product output XY was eleven, represented by eleven output pulses occurring within the same time period and appearing at terminal 15.

Returning now to the earlier noted consideration that a counter pulse only occurs when the terminals $Y_1$ . . . $Y_9$ are pulsed or not pulsed from the shift register 20 in the sequence properly representing the binary multiplier. By virtue of the synchronization provided, a pulse appears at terminal 11 only when the Y terminals are simultaneously pulsed with potentials correctly representing the binary digits in the Y multiplier. It is during the simultaneous occurrence of all these pulses that binary counter 13 is operative together with the gates and the buffers to pass a signal through to the output product terminal 15. In summary, the product XY is a pulse train whose rate is equal to the input rate multiplied by a fraction less than unity, represented as a binary code which is intermittently applied to the Y terminals from shift register 20. Both the input rate and the binary code in storage may be adjusted as desired, subject only to the relative frequency limitation stated earlier, and the rate at terminal 15 will remain proportional to the product.

Although Fig. 1 illustrates a counter for achieving synchronism, other means are available for performing this function. In some computers, identification or "clock" pulses are generated to indicate the initiation of a binary number. This type of pulse may be employed in substitution for the counter output.

From a consideration of the system details set forth above, it will now be apparent that the rate multiplied disclosed herein is of general application and its principles may be adapted to binary systems of greater or fewer digits simply by appropriately changing the number of counter stages, gates and storage stages. Nothing inherently limits the system to association with magnetic shift registers. Electron tube flip-flops, or similar circuits using semi-conductor techniques and certain types of delay line memory units, are equally applicable.

With the invention described as embodied in a particular form, it will be apparent that numerous modifications and departures may now be made by those skilled in this electrical computation and other arts. Consequently, the invention herein is to be construed as limited only by the spirit and scope of the appended claims.

What is claimed is:

1. Computation apparatus comprising, a rate multiplier, having a first input for energization by a serial train of impulses, a second input of parallel lines for energization by a binary number signal in parallel binary notation and an output for providing a number of output impulses per unit time equal to the product of the rate of said serial train of impulses with said binary number, a shift register arranged for circulating storage of a binary digital multiplier signal, first means associated with said shift register for intermittently yielding output pulses when the binary multiplier signal in storage is of predetermined sequence, a source of multiplicand pulses having a minimum period therebetween greater than the period of said output pulses, means for storing each multiplicand pulse, means for releasing each of said stored multiplicand pulses in time coincidence with the next consecutive output pulse, and means for substantially simultaneously applying said released multiplicand pulse to said rate multiplier first input and the parallel binary multiplier signal available from said shift register to said rate multiplier second input.

2. Computation apparatus comprising, in combination a binary counter having a plurality of cascaded counter stages, a corresponding plurality of gate circuits having first and second inputs, each of said first inputs being respectively energized from one of said counter stages in response to a predetermined number of input pulses, means for selectively activating said second inputs of said gate circuits in accordance with an intermittently available parallel line binary signal representative of a binary number having a number of digits equal to said plurality of gate circuits, a source of electrical impulses having a minimum time spacing between consecutive pulses thereof no less than the minimum period between intervals of availability of said intermittent parallel line binary signal, a synchronizer, means for applying said electrical impulses to said synchronizer, means for activating said synchronizer for the release of the last applied electrical impulse during a period of availability of said parallel line binary signal, means for applying impulses released from said synchronizer to said binary counter whereby each of said counter stages provides progressively fewer output impulses for application to respective gate circuit first inputs in accordance with the significance of associated ones of said binary number digits, said gate circuits, when activated, providing gated impulses occurring during mutually exclusive time intervals, an output terminal, and means for coupling all said gated impulses to said output terminal to provide an output signal of impulses whose rate is equal to the product of the rate of said source and said binary number.

3. Computation apparatus comprising a rate multiplier circuit, a storage register for a binary multiplier signal, means associated with said register for substantially periodically yielding an output pulsed signal on parallel lines representative of the value of each digit in said binary multiplier, a source of multiplicand pulses having a minimum time interval therebetween no less than the period of said output signal from said register, means for storing each multiplicand pulse, means for releasing each of said stored multiplicand pulses in time coincidence with the next consecutive output signal from said register, and means for substantially simultaneously applying said released multiplicand pulse and said parallel line binary multiplier available from said register to said rate multiplier circuit, said rate multiplier being thereby effective to provide an output pulse train whose rate is equal to the product of the rate of occurrence of said multiplicand pulses and the value represented by said binary multiplier.

4. Digital computation apparatus comprising, a rate multiplier circuit, a shift register having a predetermined number of stages arranged for circulating storage of a binary multiplier having a like number of digits, means associated with said shift register for intermittently yielding simultaneous groups of output pulses when the binary signal in storage therein is of predetermined sequence, a source of time spaced multiplicand pulses having a minimum period therebetween no less than the minimum period between said parallel line output pulses, a synchronizer for temporarily storing each multiplicand pulse and for releasing each of said stored multiplicand pulses in time coincidence with the next consecutive group of parallel line output pulses and means for substantially simultaneously applying said released multiplicand pulse and said last mentioned group of parallel line binary multiplier pulses available from said shift register to said rate multiplier circuit, said rate multiplier being thereby effective to provide an output pulse train whose rate is equal to the product of the rate of occurrence of said multiplicand pulses and the value represented by said binary multiplier.

5. Apparatus for deriving an output signal pulse train having a number of pulses per unit time characteristic of the product of a first quantity represented by the pulses per unit time in an input signal and a second quantity represented by an intermittently available signal representative of a binary number having a plurality of digits each of which may assume first and second values, said apparatus comprising, means for storing said binary number signal, means for releasing the latter signal from storage coincidentally with each input pulse whereby a gating pulse is provided for each stored digit of said first value, respective gating means associated with each digit and responsive to each associated gating pulse for deriving an output signal pulse when a predetermined number of input pulses have preceded the contemporary input pulse, said predetermined number being related to the significance of the digit associated with the respective gating pulse, means for constraining all said output signal pulses to occur during mutually exclusive time intervals, an output terminal, and means for coupling all said output signal pulses to said output terminal.

6. Apparatus for deriving an output pulse train having a number of pulses per unit time characteristic of the product of a first quantity represented by the pulses per unit time in an input signal and a second quantity represented by an intermittently available parallel line signal representative of a binary number having a plurality of digits each of which may assume first and second values, said apparatus comprising, means for storing said binary number signal, means for storing each of said pulses in said input signal, means for intermittently releasing from storage said binary number signal, means for releasing each of said input signal pulses from storage only in time coincidence with the release from storage of said binary number signal, said released binary number signal providing a gating pulse for each stored digit of said first value, respective gating means associated with each digit and responsive to each associated gating pulse for deriving an output signal pulse when a predetermined number of input pulses released from storage have preceded the contemporary input pulse, said predetermined number being related to the significance of the digit associated with the respective gating pulse, means for constraining all said output signal pulses to occur during mutually exclusive time intervals, an output terminal, and means for coupling all said output signal pulses to said output terminal.

7. Apparatus for deriving an output pulse train having a number of pulses per unit time characteristic of the product of a first quantity represented by the pulses per unit time in an input signal and a second quantity represented by an intermittently and cyclically available parallel line signal representative of a binary number having a plurality of digits each of which may assume first and second values, said apparatus comprising, a recirculating shift register circuit means for storing said binary number signal, a synchronizer for temporarily storing each of said pulses in said input signal, means for intermittently releasing from storage said binary number signal, means for releasing each of said stored input signal pulses from said synchronizer only in time coincidence with the release from shift register storage of said binary number signal, said released binary number signal providing a gating pulse for each stored digit of said first value, and respective gating means associated with each digit and responsive to each associated gating pulse for deriving an output signal pulse when a predetermined number of input pulses released from said synchronizer have preceded the contemporary input pulse, said predetermined number being related to the significance of the digit associated with the respective gating pulse.

References Cited in the file of this patent

UNITED STATES PATENTS

| | | |
|---|---|---|
| 2,461,895 | Hardy et al. | Feb. 15, 1949 |
| 2,568,724 | Earp et al. | Sept. 25, 1951 |
| 2,623,115 | Woods-Hill et al. | Dec. 23, 1952 |
| 2,635,229 | Gloess et al. | Apr. 14, 1953 |
| 2,672,283 | Havens | Mar. 16, 1954 |
| 2,702,666 | Dickinson | Feb. 22, 1955 |

FOREIGN PATENTS

| | | |
|---|---|---|
| 1,035,453 | France | Apr. 15, 1953 |
| 667,794 | Great Britain | Mar. 5, 1952 |

UNITED STATES PATENT OFFICE

CERTIFICATION OF CORRECTION

Patent No. 2,913,179                        November 17, 1959

Bernard M. Gordon

It is hereby certified that error appears in the above numbered patent requiring correction and that the said Letters Patent should read as corrected below.

Column 2, line 18, for "multiplied" read -- multiplier --; column 4, line 25, for "$P=(X/2^n)Y_n$" read -- $P_n=(X/2^n)Y_n$ --.

Signed and sealed this 25th day of April 1961.

(SEAL)
Attest:

ERNEST W. SWIDER
Attesting Officer

DAVID L. LADD
Commissioner of Patents